United States Patent
Finch et al.

(10) Patent No.: US 10,019,743 B1
(45) Date of Patent: Jul. 10, 2018

(54) METHODS AND SYSTEMS FOR AUTO EXPANDING VENDOR SELECTION

(71) Applicant: Altisource S.á r.l., Luxembourg (LU)

(72) Inventors: Steven W. Finch, Atlanta, GA (US); Donnie Wu, Atlanta, GA (US); Jayashree Vendatharamanujam, Atlanta, GA (US)

(73) Assignee: Altisource S.á r.l., Luxembourg (LU)

( * ) Notice: Subject to any disclaimer, the term of this patent is extended or adjusted under 35 U.S.C. 154(b) by 446 days.

(21) Appl. No.: 14/858,576

(22) Filed: Sep. 18, 2015

Related U.S. Application Data (60) Provisional application No. 62/052,962, filed on Sep. 19, 2014.

(51) Int. Cl.
*G06Q 30/00* (2012.01)
*G06Q 30/06* (2012.01)

(52) U.S. Cl.
CPC ..... *G06Q 30/0605* (2013.01); *G06Q 30/0633* (2013.01)

(58) Field of Classification Search
CPC .................................................. G06Q 30/0605
USPC ....................................................... 705/26.2
See application file for complete search history.

(56) References Cited

U.S. PATENT DOCUMENTS

| | | | |
|---|---|---|---|
| 4,799,156 A | 1/1989 | Shavit et al. | |
| 5,283,828 A | 2/1994 | Saunders et al. | |
| 5,592,375 A | 1/1997 | Salmon et al. | |
| 5,721,900 A | 2/1998 | Banning et al. | |
| 5,734,890 A | 3/1998 | Case et al. | |
| 5,758,328 A | 5/1998 | Giovannoli | |
| 5,799,289 A | 8/1998 | Fukushima et al. | |
| 5,940,812 A | 8/1999 | Tengel et al. | |
| 5,995,947 A | 11/1999 | Fraser et al. | |
| 6,167,385 A | 12/2000 | Hartley-Urquhart | |
| 6,275,977 B1 | 8/2001 | Nagai | |
| 6,360,311 B1 | 3/2002 | Zandveld et al. | |

(Continued)

FOREIGN PATENT DOCUMENTS

| | | |
|---|---|---|
| WO | 0115047 | 3/2001 |
| WO | 0131485 | 5/2001 |

OTHER PUBLICATIONS

"MindBox", ARTEnterprise, 2005, 8 pages.

(Continued)

*Primary Examiner* — Alexis Casey
(74) *Attorney, Agent, or Firm* — Meunier Carlin & Curfman LLC (57) ABSTRACT

An example system for automatically expanding a vendor selection cycle for fulfillment of a requested product or service can include a processor, a user interface, and a database. The database can store a plurality of vendors characterized by one or more vendor characteristics. The processor can be configured to associate the requested product or service with a plurality of order characteristics, compare the one or more vendor characteristics for each of the plurality of vendors with the plurality of order characteristics, and filter the plurality of vendors to yield a set of viable vendors according to the comparison. The processor can also rank the set of viable vendors, send order requests based on the ranking, and automatically expand the list based on whether the order is fulfilled within a pre-determined period of time.

18 Claims, 5 Drawing Sheets

(56) References Cited

U.S. PATENT DOCUMENTS

| | | |
|---|---|---|
| 6,418,416 B1 | 7/2002 | Rosenberg |
| 6,513,019 B2 | 1/2003 | Lewis |
| 6,578,015 B1 | 6/2003 | Haseltine |
| 6,594,633 B1 | 7/2003 | Broerman |
| 6,606,606 B2 | 8/2003 | Starr |
| 6,611,816 B2 | 8/2003 | Lebda et al. |
| 6,647,374 B2 | 11/2003 | Kansal |
| 6,687,713 B2 | 2/2004 | Mattson |
| 6,693,236 B1 | 2/2004 | Gould et al. |
| 6,711,554 B1 | 3/2004 | Salzmann et al. |
| 6,868,413 B1 | 3/2005 | Grindrod et al. |
| 6,882,986 B1 | 4/2005 | Heinemann et al. |
| 6,928,411 B1 | 8/2005 | Fox |
| 6,985,886 B1 | 1/2006 | Broadbent et al. |
| 7,013,289 B2 | 3/2006 | Horn et al. |
| 7,050,874 B1 | 5/2006 | Tenorio |
| 7,072,857 B1 | 7/2006 | Calonge |
| 7,089,503 B1 | 8/2006 | Bloomquist et al. |
| 7,107,241 B1 | 9/2006 | Pinto |
| 7,110,976 B2 | 9/2006 | Heimermann et al. |
| 7,110,979 B2 | 9/2006 | Tree |
| 7,124,107 B1 * | 10/2006 | Pishevar ............... G06Q 30/06 705/37 |
| 7,155,403 B2 | 12/2006 | Cirulli et al. |
| 7,212,995 B2 | 5/2007 | Schulkins |
| 7,225,220 B2 | 5/2007 | Gonzalez et al. |
| 7,349,868 B2 | 3/2008 | Tenorio |
| 7,366,694 B2 | 4/2008 | Lazerson |
| 7,389,242 B2 | 6/2008 | Frost |
| 7,392,216 B1 | 6/2008 | Palmgren et al. |
| 7,412,409 B2 | 8/2008 | Aliabadi et al. |
| 7,416,131 B2 | 8/2008 | Fortune et al. |
| 7,437,327 B2 | 10/2008 | Lam et al. |
| 7,444,298 B2 | 10/2008 | Gilberto et al. |
| 7,444,302 B2 | 10/2008 | Hu et al. |
| 7,451,106 B1 | 11/2008 | Gindlesperger |
| 7,472,089 B2 | 12/2008 | Hu et al. |
| 7,555,459 B2 | 6/2009 | Dhar et al. |
| 7,558,756 B1 | 7/2009 | Wesly et al. |
| 7,653,592 B1 | 1/2010 | Flaxman et al. |
| 7,680,728 B2 | 3/2010 | Lazerson et al. |
| 7,707,055 B2 | 4/2010 | Behmoiras et al. |
| 7,707,071 B2 | 4/2010 | Rigole |
| 7,707,153 B1 | 4/2010 | Petito et al. |
| 7,711,191 B2 | 5/2010 | Kosek et al. |
| 7,720,730 B2 | 5/2010 | Wiryawan et al. |
| 7,742,980 B1 | 6/2010 | Klein |
| 7,747,520 B2 | 6/2010 | Livermore et al. |
| 7,827,103 B1 | 11/2010 | Fu et al. |
| 7,853,464 B2 | 12/2010 | Bhatnagar et al. |
| 7,899,741 B2 | 3/2011 | Hooley et al. |
| 7,904,383 B2 | 3/2011 | Livermore et al. |
| 7,925,579 B1 | 4/2011 | Flaxman et al. |
| 7,950,230 B2 | 5/2011 | Nishikawa et al. |
| 8,024,261 B2 | 9/2011 | Erbey et al. |
| 8,027,982 B2 | 9/2011 | Ture et al. |
| 8,117,117 B2 | 2/2012 | Hu et al. |
| 8,121,938 B1 | 2/2012 | Zettner et al. |
| 8,224,745 B2 | 7/2012 | Gilberti et al. |
| 8,266,013 B2 | 9/2012 | Kennedy et al. |
| 8,275,701 B2 | 12/2012 | Erbey et al. |
| 8,326,748 B1 | 12/2012 | Klein |
| 8,364,579 B2 | 2/2013 | Hu et al. |
| 8,386,378 B2 | 2/2013 | Halper et al. |
| 8,423,451 B1 | 4/2013 | Flaxman et al. |
| 8,489,498 B1 | 4/2013 | Flaxman et al. |
| 8,458,074 B2 | 6/2013 | Showalter |
| 8,458,082 B2 | 6/2013 | Halper et al. |
| 8,473,409 B2 | 7/2013 | Erbey et al. |
| 8,478,659 B2 | 7/2013 | Behmoiras et al. |
| 8,521,631 B2 | 8/2013 | Abrahams et al. |
| 8,543,436 B2 | 9/2013 | Bhatnagar et al. |
| 8,571,973 B1 | 10/2013 | Haberaecher et al. |
| 8,595,130 B2 | 11/2013 | Johnson et al. |
| 8,600,798 B1 | 12/2013 | Corr et al. |
| 8,600,876 B2 | 12/2013 | Smith et al. |
| 8,626,645 B1 | 1/2014 | Lazerson |
| 2001/0037287 A1 | 11/2001 | Broadbent et al. |
| 2001/0054008 A1 | 12/2001 | Miller et al. |
| 2001/0056362 A1 | 12/2001 | Hanagan et al. |
| 2002/0007324 A1 | 1/2002 | Centner et al. |
| 2002/0023046 A1 | 2/2002 | Callahan et al. |
| 2002/0040339 A1 | 4/2002 | Dhar et al. |
| 2002/0052835 A1 | 5/2002 | Toscano |
| 2002/0065735 A1 | 5/2002 | Hatakama et al. |
| 2002/0065736 A1 | 5/2002 | Willner et al. |
| 2002/0111842 A1 | 8/2002 | Miles |
| 2002/0138413 A1 | 9/2002 | Creamer et al. |
| 2002/0156797 A1 | 10/2002 | Lee et al. |
| 2002/0188483 A1 | 12/2002 | Fisher |
| 2003/0004854 A1 | 1/2003 | Greene et al. |
| 2003/0018558 A1 | 1/2003 | Heffner et al. |
| 2003/0018575 A1 | 1/2003 | Beggins et al. |
| 2003/0033587 A1 | 2/2003 | Ferguson et al. |
| 2003/0097308 A1 | 5/2003 | Connors et al. |
| 2003/0101085 A1 | 5/2003 | Butler, III et al. |
| 2003/0105684 A1 | 6/2003 | Dunn et al. |
| 2003/0220855 A1 | 11/2003 | Lam et al. |
| 2003/0229582 A1 | 12/2003 | Sherman et al. |
| 2003/0233316 A1 | 12/2003 | Hu et al. |
| 2004/0002915 A1 | 1/2004 | McDonald et al. |
| 2004/0019528 A1 | 1/2004 | Broussard et al. |
| 2004/0044602 A1 | 3/2004 | Batur et al. |
| 2004/0044603 A1 | 3/2004 | Gordon-Ervin et al. |
| 2004/0064389 A1 | 4/2004 | Force et al. |
| 2004/0078277 A1 | 4/2004 | Gindlesperger |
| 2004/0078288 A1 | 4/2004 | Forbis et al. |
| 2004/0083119 A1 | 4/2004 | Schunder et al. |
| 2004/0083148 A1 | 4/2004 | Chadrow |
| 2004/0088411 A1 | 5/2004 | Jakubowski et al. |
| 2004/0111346 A1 | 6/2004 | MacBeth et al. |
| 2004/0215618 A1 | 10/2004 | Wacke et al. |
| 2004/0249705 A1 | 12/2004 | Spencer et al. |
| 2004/0249914 A1 | 12/2004 | Flocken et al. |
| 2005/0010423 A1 | 1/2005 | Bagbey et al. |
| 2005/0075978 A1 | 4/2005 | Leavitt et al. |
| 2005/0216395 A1 | 9/2005 | Behmoiras et al. |
| 2005/0234853 A1 | 10/2005 | Barth et al. |
| 2005/0289046 A1 | 12/2005 | Conyack |
| 2006/0155640 A1 | 7/2006 | Kennedy et al. |
| 2006/0190394 A1 | 8/2006 | Fraser et al. |
| 2006/0235788 A1 | 10/2006 | Guyton |
| 2007/0136696 A1 | 6/2007 | Matthews |
| 2008/0152209 A1 | 6/2008 | Kosek et al. |
| 2009/0030811 A1 | 1/2009 | Gilberto et al. |
| 2009/0048883 A1 | 2/2009 | Kelly et al. |
| 2009/0240596 A1 | 9/2009 | Kennedy et al. |
| 2010/0268558 A1 | 10/2010 | Behmoiras et al. |
| 2013/0006797 A1 | 1/2013 | Kennedy et al. |
| 2013/0006846 A1 | 1/2013 | Erbey et al. |
| 2013/0290126 A1 | 10/2013 | Behmoiras et al. |
| 2016/0225075 A1 | 8/2016 | Kennedy et al. |

OTHER PUBLICATIONS

"Ocwen Unveils Enhanced Vendor Management Tool for Mortgage", www.press.arrivenet.com, Mar. 24, 2005, pp. 1-2.
"The Growth of Internailized Vendor Management Subsidiaries", www.atmprof.com, Mar. 31, 2005, pp. 1-2.
"Vendor Management Subsidiary Strategic Benefits" www.atmprof.com, Mar. 31, 2005, pp. 1-2.
American Land Title Association, "ALTA Technology New", pp. 2, Jul. 10, 2007, http://www.alta.org/technology/news.cfm?newsID=5187.
Bartolini, "E-Payables Axis", Aberdeen Axis, Aberdeen Group, 2009.
Bartolini, "E-payables Benchmark 2009: Accounts Payable Rising", Aberdeen Group, 2009.
Bartolini, Chris Dwyer et al., "The CFO's View of Procurement", Aberdeen Group, 2009.
Dorado White Paper, "The Dorado Advantage-Networked Origination for the Agile Enterprise", 12 pages, 2006.

(56) References Cited

OTHER PUBLICATIONS

Enzweiler, "The 'Sizzle' in Client Server Systems, management Accounting vol. 77 No. 8".
Kersnar, "Putting All the Pieces Together", SourceMedia Inc. and Mortgage Technology, vol. 13, No. 6, Jul. 2006.
Kimball, "Tracking your department budgets, commitments, and actuals with dimensions model", Business Wire, 1999.
Metavante Lending Solutions, "Loan Origination Studio: Metavante Lending Solutions", 2007, 10 pages, http://www.ghrsystems.com/ProductsServices/mortgage.sub.--solutions/ghr.s- ub.--los.html.
Mortgage Cadence Enterprise Lending Solutions, "Mortgage Cadence Orchestrator (Business Components)", 2007, 4 pages, http://www.mortgagecadence.com/productsOrchestrator.asp.
Verian Technologies, "ProcureIT User Manual Version 4.2.5", 2000, 264-267, 42-51.
Co-pending U.S. Appl. No. 13/924,260, filed Jun. 21, 2013, and its file history.
Co-pending U.S. Appl. No. 13/932,532, filed Jul. 1, 2013, and its file history.
Co-pending U.S. Appl. No. 14/981,553, filed Dec. 28, 2015, and its file history.
Co-pending U.S. Appl. No. 13/608,194, filed Sep. 10, 2012, and its file history.

\* cited by examiner

METHODS AND SYSTEMS FOR AUTO EXPANDING VENDOR SELECTION

CROSS-REFERENCE TO RELATED APPLICATIONS

This application claims the benefit of U.S. Provisional Application Ser. No. 62/052,962, filed on Sep. 19, 2014, and entitled "METHODS AND SYSTEMS FOR AUTO EXPANDING VENDOR SELECTION," which is hereby incorporated by reference in its entirety.

BACKGROUND OF THE INVENTION

Field of the Technology

The vendor selection system described herein provides methods and systems for automatically selecting vendors of goods and/or services based on pre-selected and/or editable criteria provided by a user of the system. More specifically, the present disclosure relates to automatically expanding the field of viable vendors in consideration of elapsed time from placing an order request and vendor filtering according to order characteristics and vendor characteristics.

Background of the Technology

While computer-implemented systems for vendor selection exist, these systems lack contain functionality to select a vendor based on specific user criteria or feedback. For example, these computer-implemented systems are not easy to customize, and often apply the same methodology for vendor selection without regard to the type of product being ordered or the preferences of the system user who places the order.

Accordingly, it is therefore desirable to provide methods and systems for intelligently and automatically applying pre-selected or editable criteria to a universe of vendor offerings, systematically submitting orders to vendors based on rank or profile, and automatically expanding the vendor list to include additional potential vendors as necessary.

SUMMARY OF THE INVENTION

Described herein are methods and systems for automatic vendor filtering and selection. More particularly, described herein are computer-implemented methods and systems for utilizing user criteria in order to automatically select vendors from a universe of known vendors.

In an aspect of the vendor selection system described herein, a system may comprise at least one processor, a user interface in communication with the at least one processor, and a storage medium in communication with the at least one processor. The storage medium can have contained therein a database comprising a plurality of vendors, each of the plurality of vendors characterized by one or more vendor characteristics. The at least one processor can be configured to associate the requested product or service with a plurality of order characteristics, compare the one or more vendor characteristics for each of the plurality of vendors with the plurality of order characteristics, filter the plurality of vendors to yield a set of viable vendors according to the comparison, rank the set of viable vendors according to the extent to which the plurality of order characteristics is matched with the one or more vendor characteristics, and select a first predetermined number of the plurality of vendors comprising the set of viable vendors according to the ranking to yield a first preferred vendor set. By way of example, the vendor characteristics may comprise the vendor's distance to a property associated with the good or service, past cycle time performance, past quality performance, incidence of order cancelation, and/or time elapsed since the last order. Also by way of example, the order characteristics may comprise one or more requisite characteristics and one or more ranking characteristics. In this implementation, the requisite characteristics may be those necessary to fulfillment of the vendor request, such as the type of product or service offered by the vendor and whether the vendor is licensed to operate in a certain location. The ranking characteristics, on the other hand, may comprise characteristics that make the vendor preferred over others without regard to the requisite characteristics, such as past performance time, past quality, proximity to user, etc.

Additionally or alternatively, once vendors are filtered into a first preferred vendor set, the at least one processor may further simultaneously transmit to each of the plurality of vendors in the first preferred vendor set an order request identifying the requested product or service, determine whether at least one of the plurality of vendors comprising the first preferred vendor set accepts the order request within a first predetermined time period, and upon a determination that at least one of the plurality of vendors comprising the first preferred vendor set accepts the order request within a first predetermined time period, facilitate completion of the order request with the first in time of the at least one of the plurality of vendors to accept the order request. Further, upon a determination that at least one of the plurality of vendors comprising the first preferred vendor set does not accept the order request within the first predetermined time period, the system can expand the selection of the first preferred vendor set to yield a second preferred vendor set. This second preferred vendor set may or may not also comprise the first set of vendors.

Additionally or alternatively, upon the expansion to the second preferred vendor set, the system can determine whether at least one of the plurality of vendors comprising the second preferred vendor set accepts the order request within a second predetermined time period. Upon the determination that at least one of the plurality of vendors comprising the second preferred vendor set accepts the order request within a second predetermined time period, the system can facilitate completion of the order request with the first in time of the at least one of the plurality of vendors to accept the order request.

Optionally, the system may be configured to determine if the set of viable vendors has been exhausted and, upon a finding that the set of viable vendors has not been exhausted, repeat the process until a vendor accepts the order request.

Optionally, the system may be configured to determine if an overall time limit has elapsed and, upon a finding that the overall time limit has not elapsed, repeat the process until a vendor accepts the order request.

Optionally, the system may be configured to, upon the determination that at least one of the plurality of vendors comprising the second preferred vendor set has not accepted the order request within the second predetermined time period, accept the manual selection of a vendor.

Additionally or alternatively, the system may also be configured to accept one or more boundary conditions and eliminate any of the vendors comprising the first preferred vendor set for whom the one or more vendor characteristics do not satisfy the one or more boundary conditions. The boundary conditions may comprise a cost for the requested good or service, a geographic location of the vendor, and/or a projection of a completion date for the requested good or service by the vendor.

Optionally, the system may be configured to assign a weighting criterion to each of the plurality of order characteristics. A weighting criterion can be in the form of a single number regardless of the vendor's score for a particular order characteristic, or instead it can be a custom equation that varies with the vendor's score of that order characteristic or other factors. For example, if one order characteristic is the distance from the vendor to the location where the service will be provided, there may not be much difference in the requestor's preferences whether the vendor is 1 or 10 miles away, but there may be a big difference between a vendor that is 15 miles away and 20 miles away. A custom equation can therefore be used to specify the weight for this order characteristic that takes this situation into account. The schemes of weighting criteria could also vary according to what performance dimension is more important to optimize for a particular order. For example, Order A may, for whatever reason, be extremely urgent, and less sensitive to cost. The universe of viable vendors could then be ranked by past time performance and cost performance, but with a weighting favoring faster vendors with less emphasis on cost. Order B may be less urgent, and more sensitive to cost. In this case, the same rating criteria could be used, but with a different weighting to favor lower-cost vendors with less emphasis on speed. In one implementation, the system may optionally be configured to rank the set of viable vendors according to the extent to which the plurality of order characteristics is matched with the one or more vendor characteristics and the weighting criteria associated with each of the plurality of order characteristics.

Optionally, the system may be further configured to, upon the expiration of a predetermined time or the exhaustion of the set of viable vendors, assign the order request to an agent, wherein the agent may determine whether one or more requisite characteristics or one or more boundary conditions should be relaxed, and manually assign the order to a vendor.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. While implementations will be described for automatic vendor selection, it will become evident to those skilled in the art that the implementations described herein may not necessarily be limited thereto.

According to certain methods and systems described herein, the present disclosure describes a system for placing an order for a good or service with a vendor, where for example, minimizing elapsed time to find a suitable vendor who agrees to fulfill the order may be prioritized over other criteria. In particular, it may not always be preferable that the vendor that best matches order preferences be selected for order placement. Instead, if so chosen by a user, certain contexts dictate that a suitable vendor agrees to handle an order request as rapidly as possible.

In one implementation, the system may access a universe of vendors having certain characteristics. For example, the vendors may all provide a particular product or service of interest to the user. The universe may be gathered automatically by the system or by the user, or the vendors may request access to participate in the vendor system. In any event, the data associated with the universe of vendors and associated characteristics can be contained in a storage medium. As noted, vendor characteristics may include the types of products or services the vendor offers, the vendor's geographical location, industry certifications, business licenses, preferred vendor status, the vendor's current workload versus maximum capacity, a special vendor classification such as minority owned business or green certified business, etc.

According to one implementation, before or after the vendor system database is populated, an order for a product or service may be placed manually by a user or according to a workflow associated with completion of a transaction. When an order request is placed, the universe of vendors may be filtered to eliminate vendors that do not possess certain requisite characteristics, such as the type of product or service the vendor provides, whether a vendor is licensed to operate in a particular location, or other such characteristics that are non-negotiable and necessary to the fulfillment of the product or service.

The system may thus comprise a set of business rules that identify what characteristics are necessary according to the product or service type, the person or entity making the request, regulatory requirements pertaining to certain transactions, or other considerations. Alternatively, the requisite characteristics may be selected manually by a user.

After the universe of vendors is filtered to include only those vendors having characteristics matching the requisite characteristics, the viable vendors are ranked according to various criteria. Ranking criteria may include the distance of the vendor to, for example, a property at issue, the vendor's past cycle time performance, past quality performance, time since the vendor accepted an order, user ratings, or other characteristics that can be used to compare each vendor in the viable vendor set against another. After ranking the viable vendor set, boundary conditions may be applied for any of the ranking criteria to further limit vendor selection. For example, boundary conditions may include a maximum travel distance from the vendor to a property at issue, a vendor's capability to fulfill an order within a specified time period, or a minimum user rating.

After the vendors are filtered and ranked, and any boundary conditions are applied, a predetermined number or other grouping of vendors may be selected to receive an order request. For example, the top five of the filtered and ranked vendors may be simultaneously presented with the order request, which can include all details needed to fulfill the order. A time limit can then be imposed, and the system may make vendors aware that the order request has been distributed to multiple vendors, thus encouraging the vendors' rapid consideration and acceptance.

Immediately upon acceptance by a vendor of the order request, the order can then be automatically assigned to the first vendor to accept, and the system can then notify all other vendors that the order request is no longer available. The system may then provide confirmation to the requestor, facilitate communication between the requestor and vendor, provide any additional information necessary to the vendor, and/or track the fulfillment of the order to completion.

If a vendor from the initial set of selected vendors does not accept the order request within a predetermined time period, the system may expand the vendor set to which the order request is sent. For example, following the example above, if none of the top five of the filtered and ranked vendors accept the order request within a set time of twenty-four hours, the set may be expanded to the next twenty vendors according to their rank. The expansion may either include the first set of vendors, to afford them extra time to accept the order request, or the expansion may comprise an entirely new set of vendors.

In this implementation, the second set of vendors (i.e., the expanded set of vendors) may be similarly allotted a specific time period in which to accept. Upon acceptance by one of the expanded set of vendors of the order request, the order can be assigned to the vendor that accepted first. If no vendor accepts the order request within the second allotted time period, the expansion process may repeat until either a vendor does accept or until the time allocated to automatically fulfill the order is exhausted.

If a vendor does not accept the order request, or if available time for fulfilling the order is exhausted, the order request may be diverted to a manual placement queue. An agent may then manually determine whether requisite characteristics or boundary conditions should be relaxed, and/or manually assign the order to a vendor. Additionally or alternatively, ranking criteria may be weighted such that certain order characteristics are more or less important in assigning an overall rank to a vendor. For example, user reviews of quality may be a preferred criterion, and as such may be assigned a high weight as against other non-requisite vendor characteristics.

An example application of the vendor selection system is provided for the financial industry. In this example, a requestor places an order request for an appraisal of a property located at a specific address. The universe of vendors is then filtered to eliminate vendors that are unable to provide an appraisal of the property and do not provide services in the general geographic region in which the property address is located. All vendors capable of providing an appraisal of the property at the property's address are then ranked according to each vendor's user ratings, with the vendor having the highest user rating is ranked highest, and so on. All vendors are further ranked according to each vendor's aggregated past cycle time performance, with the vendor having the highest user rating and the fastest aggregated past cycle time performance being ranked the highest, et cetera. In one example, after ranking of all viable vendors is performed, the boundary condition of user rating equal to or greater than three of five stars is applied, eliminating any ranked viable vendors having user rating lower than three of five stars. In an example, boundary conditions may automatically be applied if the number of ranked viable vendors is above a certain number. For example, if the number of ranked viable vendors is over 20, boundary conditions may automatically be applied. In another example, if the number of ranked viable vendors is fifteen or less, boundary conditions are not applied. Further considering the former example, of the remaining ranked, viable vendors to survive application of the user rating boundary condition, a first preferred vendor set of the top ten ranked vendors is selected. An order request containing details regarding the appraisal needed of the property is distributed simultaneously and electronically to the vendors of the first preferred vendor set. The order request contains the instructions regarding the appraisal, the time frame in which the appraisal is needed, the budget within which the appraisal must be made, and the address of the property. The vendors of the first preferred vendor set are informed that nine other vendors have received the same order request, and that acceptance of the order request must be made within two hours.

In this example, none of the vendors comprising the first preferred vendor set accept the order request within the two hours, thus the first preferred vendor set is expanded to include the top fifteen of the ranked vendors, thus comprising a second preferred vendor set. More specifically, in this example, the original ten vendors of the first preferred vendor set are provided another opportunity to accept an order request, but an additional five vendors, selected according to the ranking and having survived application of the boundary conditions, will also be provided the opportunity to accept the order request. The vendors are notified that they must accept the order request within one hour. In the instant example, upon expansion, the eleventh ranked vendor accepts the order request within the allotted time, and communication and exchange of details are facilitated between the requestor and the accepting vendor. Although the above-described implementation discusses vendors of goods and services related to a financial transaction, the present disclosure should be understood as being capable of being applied to a variety of contexts and technological fields beyond those addressed herein.

Figure 1:
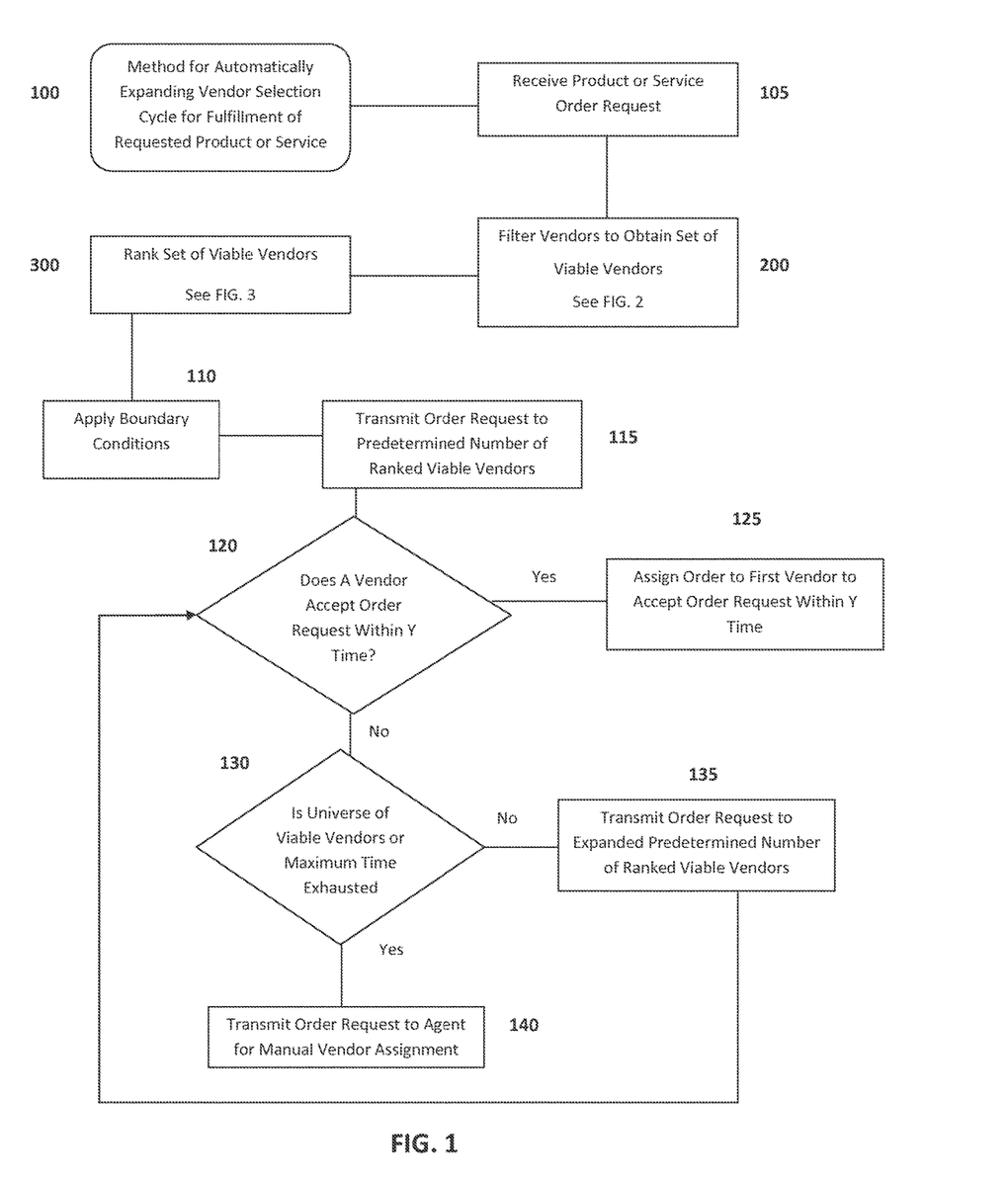
FIG. 1 illustrates a high-level example representative flow diagram of functions performed in accordance with an aspect of an exemplary vendor selection system described herein.

Referring to FIG. 1, a high-level example representative flow diagram of functions 100 performed in accordance with an aspect of an exemplary vendor selection system is shown. At step 105, a vendor system as described herein may receive a product or service request from a user. The vendor system may comprise a computer-implemented system such as described with reference to FIG. 5. For example, the vendor system may comprise at least a processor, a storage medium (comprising a database), and input device. The vendors and associated criteria may be stored in a database within the storage medium. Further, the system may communicate with other systems across a network such as described with reference to FIG. 4.

Once the order request is received, according to one implementation, at step 200 the vendor system filters the vendor records stored in the system database to obtain a set of viable vendors. This process is described in more detail with reference to FIG. 2. Once viable vendors are obtained by the system, according to one implementation, such viable vendors are ranked at step 300. This process is further described with reference to FIG. 3.

As further shown in FIG. 1, once vendors are ranked, boundary conditions may be applied at step 110. This may involve, for example, eliminating the vendors based on absence of characteristics of import to the user, such as the maximum travel distance from the vendor to a property at issue being too great, a vendor's inability to fulfill an order within a specified time period, or a vendor's failure to meet a minimum user rating. Once these boundary conditions are applied, further reducing the viable vendors, at step 115 the order request can be automatically sent to a predetermined number of ranked viable vendors. As an example, the user may wish to send the order to a list of 25 viable vendors, who comprise the first set of preferred vendors. Alternatively, a manager of the vendor system may wish for the system to assign the number or vendors who will be included in the first set of vendors to be based only on vendor rankings. For example, first set of preferred vendors may automatically include all vendors whose rank exceeds a certain score (e.g., 75% score based on ranking and application of boundary conditions), regardless of any pre-assigned total number of vendors At step 120, the vendor system determines if a viable vendor to whom the order was sent has accepted the order. In this implementation, this involves waiting a predetermined time frame (i.e., Y time, which may be for example 5 minutes). If the order is accepted within Y time, then the process concludes at step 125, and the order is assigned by the system to the first vendor to accept during the time period.

If the order is not accepted during the requested time period, according to one example implementation, the system checks at step 130 to determine whether the universe of viable vendors has been exhausted. Alternatively or additionally, the system may also check at step 130 whether the maximum time has elapsed for order fulfillment. If the maximum universe of viable vendors has been exhausted and/or the maximum time for fulfilling an order has elapsed, then the process can terminate at step 140, at which the time can transmit an order request to an agent for manual vendor assignment using traditional methods (such as those described earlier).

Conversely, if the universe of viable vendors has not been exhausted and/or the maximum time for fulfilling the order through the system has not been exhausted, then the system can automatically expand the predetermined number of ranked viable vendors at step 135. In this scenario, the system returns to step 120 as described above.

Figure 3:
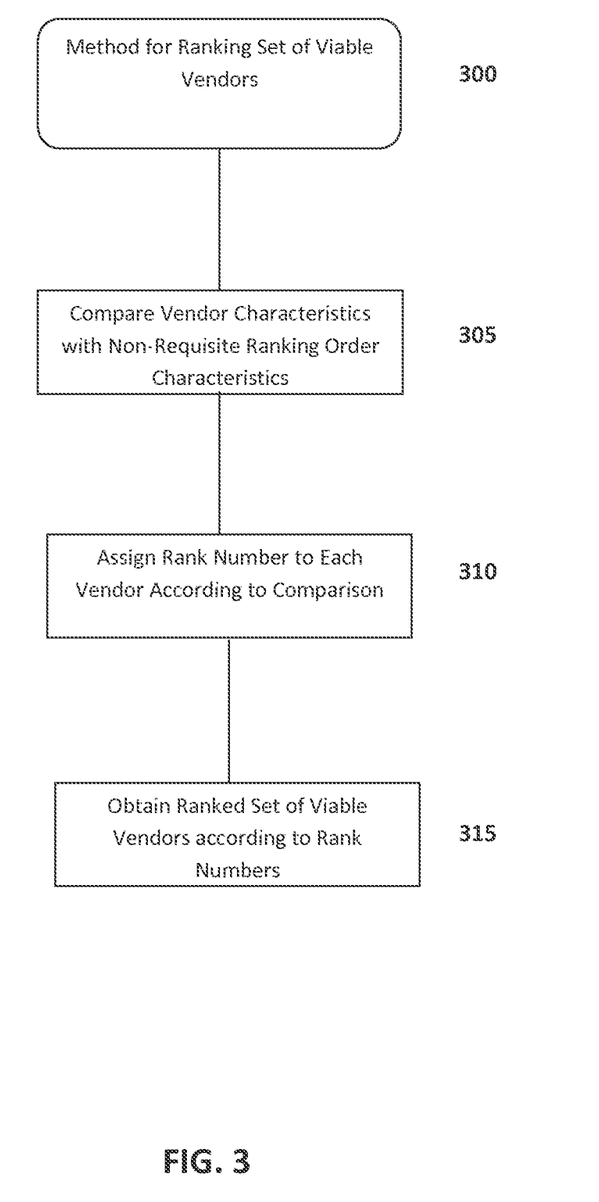
FIG. 3 illustrates a high-level example representative flow diagram of functions performed to rank a set of viable vendors in accordance with an aspect of an exemplary vendor selection system described herein.

As with the first set of preferred vendors, the second set (and subsequent sets) of ranked preferred vendors may be determined in a variety of ways. For example, the system may add an additional group of preferred vendors to the first set and send the order request to both the first and second set of viable vendors or send the order exclusively to the new set of viable vendors. In varying implementations, for example, the system may select a first set of 25 preferred viable vendors. The system may then select at step 135 a second set of 25 more different viable vendors based on the rank provided at step 300. The system may then either send the order request to the first and second set of viable vendors (i.e., all 50 vendors) or just the second set of viable vendors (i.e., the second set of 25 vendors).

Similarly, as discussed previously, the second set of preferred vendors may be pre-set at a number (i.e., select 25 more vendors) or may be determined based on specific ranking results that may be provided in step 300. In this way, the first set of preferred vendors may include all vendors scoring higher than a rank of 75%, while the second set of preferred vendors may include those vendors scoring higher than a rank of 50%, regardless of the number of vendors included in each list.

As previously discussed, regardless how the system selects the subsequent viable vendors, in an exemplary implementation the system continues selecting additional viable vendors (i.e., third set of preferred vendors, fourth set, etc.), as noted at step 130, until the universe of viable vendors is exhausted or the time for fulfilling the order through the system is exhausted.

Figure 2:
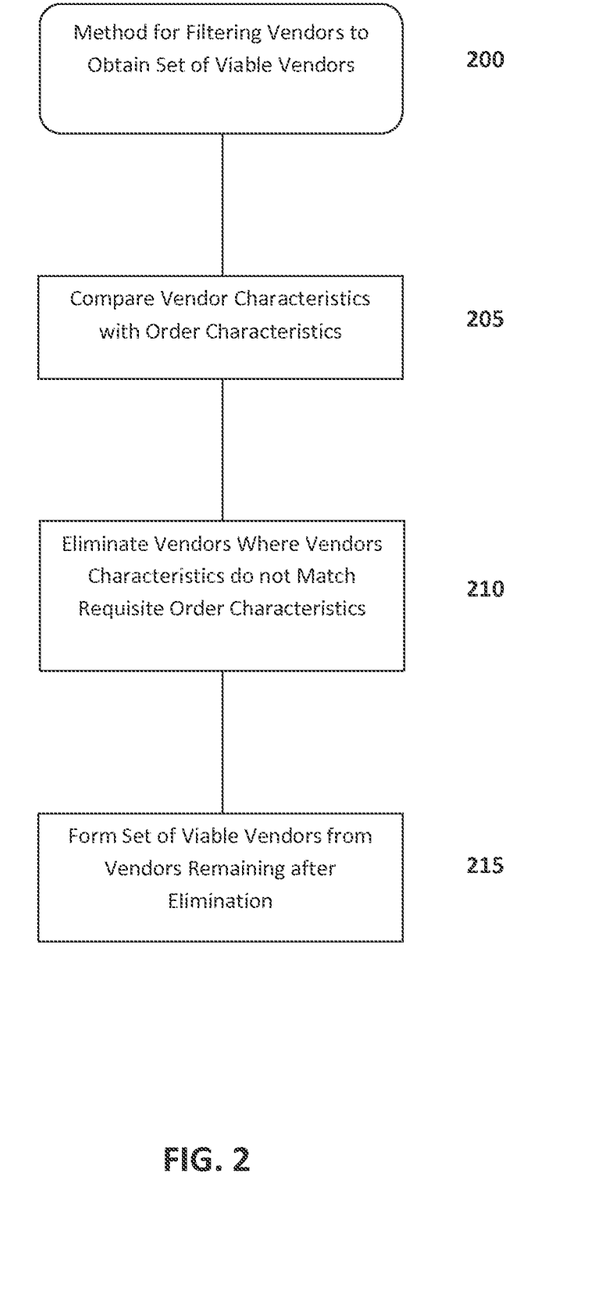
FIG. 2 illustrates a high-level example representative flow diagram of functions performed to filter a set of viable vendors in accordance with an aspect of an exemplary vendor selection system described herein.

Now referring to FIG. 2, a high-level example representative flow diagram of functions 200 performed to filter a set of viable vendors in accordance with an aspect of an exemplary vendor selection system is shown. At step 205, the system can compare the characteristics of the order with vendor characteristics. The vendor characteristics may include any number of characteristics, but may include the products and services of the vendor, the business licenses and qualifications of the vendor, the vendor's distance to a property associated with the good or service, the vendor's past cycle time performance, the vendor's past quality performance, the vendor's incidence of order cancelation, the vendor's ranking by prior users of the vendor's products and/or services, the vendor's ranking by the current user based on prior experience, and/or the time elapsed since the last order placed with the vendor. The vendor system, at step 210, then eliminates the vendors whose characteristics do not match the requisite order characteristics. The requisite order characteristics include those that must be met at a minimum to be a viable vendor. For example, a requisite characteristic would include that the vendor provide the requested product and/or service, or in some implementations, whether the vendor is authorized to perform service where needed by the user. Thus, at step 215, the vendor system then forms a set of viable vendors from the vendors remaining after the elimination of the vendors having characteristics not matching the requisite order characteristics.

Now referring to FIG. 3, a high-level example representative flow diagram of functions 300 performed to rank a set of viable vendors in accordance with aspect of an exemplary vendor selection system is shown. At step 305, the system compares vendor characteristics with non-requisite ranking order characteristics. As discussed herein, non-requisite ranking order characteristics may include, for example, a past user's rankings of the vendor, the location of the vendor with relation to the user, the time that the vendor can fill the order, and any other preferences that the user may specify.

The vendor system, at step 310, then assigns a rank number to each vendor according to the comparison performed in step 305. Alternatively, the vendor system may assign a weighted score based on the specified non-requisite characteristics. For example, a score may be generated based on a number of characteristics and then averaged to create a composite score from zero to 100. The vendors may then be ordered from zero to 100 based on score or percentage. In any event, at step 315, the vendor system obtains a ranked set of viable vendors according to rank numbers. From here, the process then flows to step 110, where boundary conditions may be applied, as previously discussed.

Figure 4:
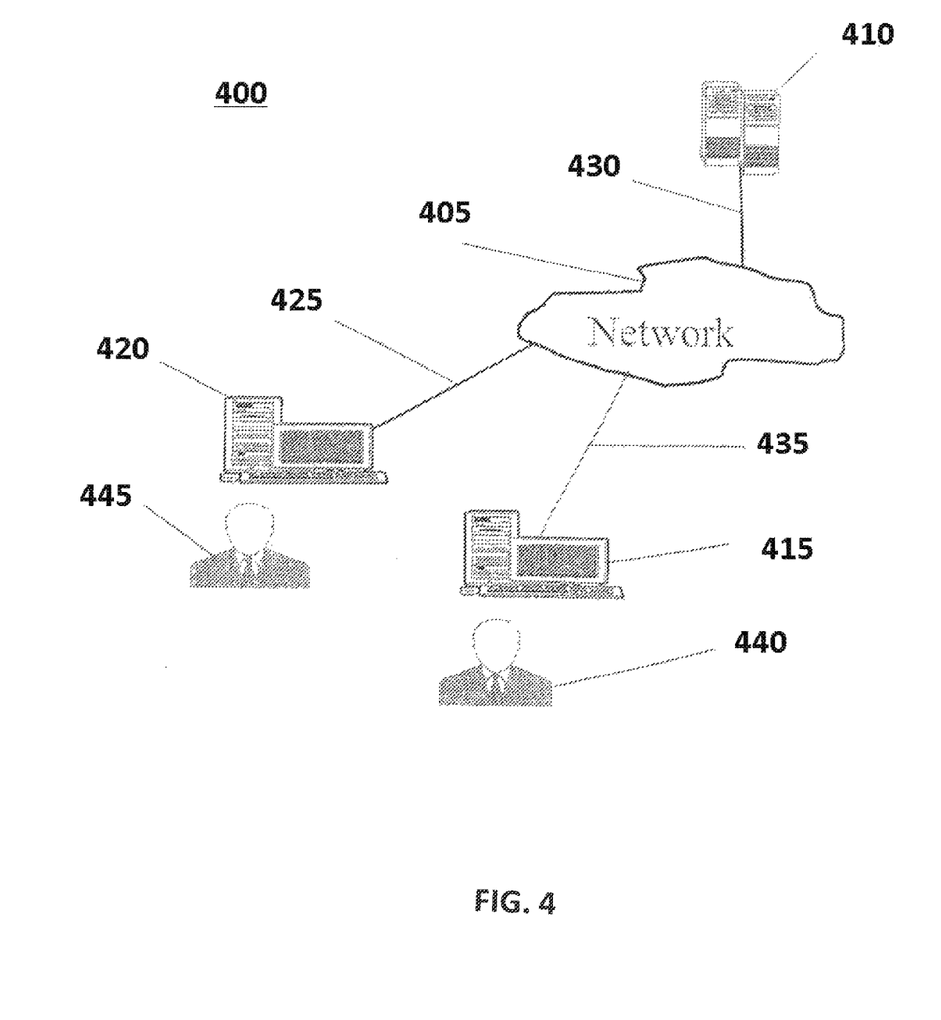
FIG. 4 illustrates an exemplary system environment comprising various hardware components and other features, in accordance with an aspect of the present invention.

In accordance with the above, FIG. 4 presents an exemplary system environment 400 comprising various hardware and software components and other features in one aspect of the present invention. The example environment 400 shown in FIG. 4 is provided only as an example. Accordingly, it should be understood that the example environment 400 can include more or fewer elements and/or be configured differently than as shown in FIG. 4.

As shown in FIG. 4, in one aspect of the present invention, data and other information and services for use in the system are, for example, input by a user 445 via a terminal 420. The terminal 420 is coupled to a server 410 via a network 405, such as the Internet, via link 425. In one aspect, a vendor 440 also inputs information/data via a terminal 415 coupled through a link 435 to the network 405.

Each of the terminals 420, 415 may include, for example, a personal computer (PC), minicomputer, mainframe computer, microcomputer, telephone device, personal digital assistant (PDA), or other device having a processor and input capability. The server 410 may include a PC, minicomputer, mainframe computer, microcomputer, or other device having a processor and a repository of data or access to a repository of data.

In operation, in one exemplary aspect of the present invention, via the network 405, vendor data, transactional data, sub-transactional data, order data and/or other information may be communicated with the server 410. The server 410 can thus receive and resolve the transaction, including triggering and resolving sub-transactions. The server may also store data regarding the transaction, vendor, and sub-transaction, and document the transaction (e.g., electronically).

In one aspect, the present invention uses active server page (ASP) technology to deliver information and services to a user. This technology may include one or more ASPs stored on the server 410. This approach reduces maintenance and hardware expenses, results in limited implementation/integration costs, limited support expense, and low total cost of ownership.

Figure 5:
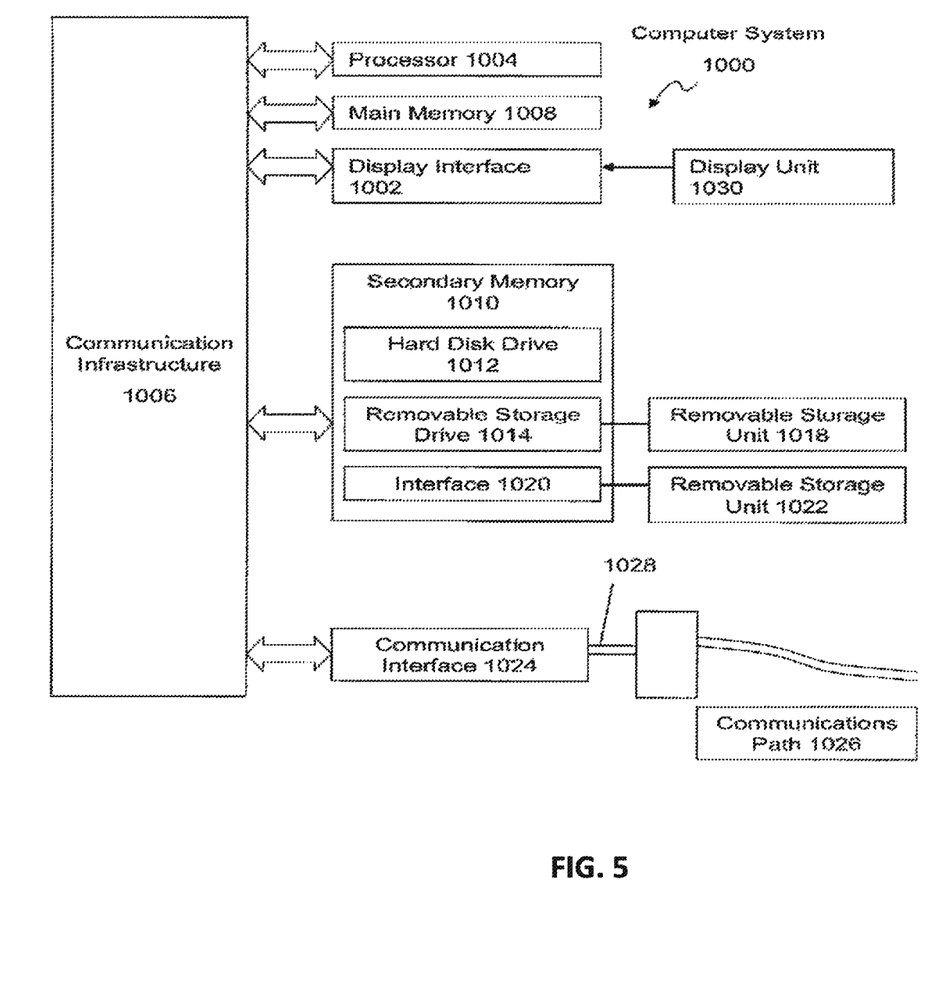
FIG. 5 illustrates hardware, software, or a combination thereof that may be implemented in one or more computer systems or other processing systems to carry out the functionality of the present invention.

The present invention may be implemented using hardware, software or a combination thereof and may be implemented in one or more computer systems or other processing systems. When the logical operations described herein are implemented in software, the process may execute on any type of computing architecture or platform. In one aspect, the invention is directed toward one or more computer systems capable of carrying out the functionality described herein. An example of such a computer system 1000 is shown in FIG. 5.

Computer system 1000 includes one or more processors, such as processor 1004. The processor 1004 is connected to a communication infrastructure 1006 (e.g., a communications bus, cross-over bar, or network). Various software aspects are described in terms of this exemplary computer system. After reading this description, it will become apparent to a person skilled in the relevant art(s) how to implement the invention using other computer systems and/or architectures.

Computer system 1000 can include a display interface 1002 that forwards graphics, text, and other data from the communication infrastructure 1006 (or from a frame buffer not shown) for display on the display unit 1030. Computer system 1000 may also include a main memory 1008, preferably random access memory (RAM), and may also include a secondary memory 1010. The secondary memory 1010 may include, for example, a hard disk drive 1012 and/or a removable storage drive 1014, representing a floppy disk drive, a magnetic tape drive, an optical disk drive, etc. The removable storage drive 1014 reads from and/or writes to a removable storage unit 1018 in a well known manner. Removable storage unit 1018, represents a floppy disk, magnetic tape, optical disk, etc., which is read by and written to removable storage drive 1014. As will be appreciated, the removable storage unit 1018 includes a computer usable storage medium having stored therein computer software and/or data.

In alternative aspects, secondary memory 1010 may include other similar devices for allowing computer programs or other instructions to be loaded into computer system 1000. Such devices may include, for example, a removable storage unit 1022 and an interface 1020. Examples of such may include a program cartridge and cartridge interface (such as that found in video game devices), a removable memory chip (such as an erasable programmable read only memory (EPROM), or programmable read only memory (PROM)) and associated socket, and other removable storage units 1022 and interfaces 1020, which allow software and data to be transferred from the removable storage unit 1022 to computer system 1000.

Computer system 1000 may also include a communications interface 1024. Communications interface 1024 allows software and data to be transferred between computer system 1000 and external devices. Examples of communications interface 1024 may include a modem, a network interface (such as an Ethernet card), a communications port, a Personal Computer Memory Card International Association (PCMCIA) slot and card, etc. Software and data transferred via communications interface 1024 are in the form of signals 1028, which may be electronic, electromagnetic, optical or other signals capable of being received by communications interface 1024. These signals 1028 are provided to communications interface 1024 via a communications path (e.g., channel) 1026. This path 1026 carries signals 1028 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1014, a hard disk installed in hard disk drive 1012, and signals 1028. These computer program products provide software to the computer system 1000. The system can comprise such computer program products.

Computer programs (also referred to as computer control logic) are stored in main memory 1008 and/or secondary memory 1010. Computer programs may also be received via communications interface 1024. Such computer programs, when executed, enable the computer system 1000 to perform the features of the present invention, as discussed herein. In particular, the computer programs, when executed, enable the processor 1004 to perform the features of the present invention. Accordingly, such computer programs represent controllers of the computer system 1000.

In an aspect where the invention is implemented using software, the software may be stored in a computer program product and loaded into computer system 1000 using removable storage drive 1014, hard drive 1012, or communications interface 1024. The control logic (software), when executed by the processor 1004, causes the processor 1004 to perform the functions of the invention as described herein. In another aspect, the invention is implemented primarily in hardware using, for example, hardware components, such as application specific integrated circuits (ASICs). Implementation of the hardware state machine so as to perform the functions described herein will be apparent to persons skilled in the relevant art(s).

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the recited claims. Various other modifications of, and equivalent steps corresponding to, the disclosed aspects of the exemplary embodiments, in addition to those described above, can be made by those skilled in the art without departing from the spirit and scope of the invention defined in the following claims, the scope of which is to be accorded the broadest interpretation so as to encompass such modifications and equivalent structures.

What is claimed:

1. A system comprising:
   at least one processor;
   a user interface in communication with the at least one processor; and
   a storage medium in communication with the at least one processor, the storage medium having stored therein a database comprising a plurality of vendors, each of the plurality of vendors characterized by one or more vendor characteristics;
   wherein the at least one processor is configured to:
   associate a requested product or service with a plurality of order characteristics;
   compare the one or more vendor characteristics for each of the plurality of vendors with the plurality of order characteristics;
   filter the plurality of vendors to yield a set of viable vendors according to the comparison;
   rank the set of viable vendors according to the extent to which the plurality of order characteristics is matched with the one or more vendor characteristics;
   select a first predetermined number of the plurality of vendors comprising the set of viable vendors according to the ranking to yield a first preferred vendor set;
   simultaneously transmit to each of the plurality of vendors in the first preferred vendor set an order request identifying the requested product or service;
   determine whether at least one of the plurality of vendors comprising the first preferred vendor set accepts the order request within a first predetermined time period;
   upon a determination that at least one of the plurality of vendors comprising the first preferred vendor set accepts the order request within a first predetermined time period, facilitate completion of the order request with the first in time of the at least one of the plurality of vendors to accept the order request;
   upon a determination that at least one of the plurality of vendors comprising the first preferred vendor set does not accept the order request within the first predetermined time period, expand the selection of the first preferred vendor set to yield a second preferred vendor set;
   upon the expansion to the second preferred vendor set, determine whether at least one of the plurality of vendors comprising the second preferred vendor set accepts the order request within a second predetermined time period;
   upon the determination that at least one of the plurality of vendors comprising the second preferred vendor set accepts the order request within a second predetermined time period, facilitate completion of the order request with the first in time of the at least one of the plurality of vendors to accept the order request.

2. The system of claim 1, wherein the at least one processor is further configured to determine if the set of viable vendors has been exhausted and, upon a finding that the set of viable vendors has not been exhausted, repeat the process until a vendor accepts the order request.

3. The system of claim 1, wherein the at least one processor is further configured to determine if an overall time limit has elapsed and, upon a finding that the overall time limit has not elapsed, repeat the process until a vendor accepts the order request.

4. The system of claim 1, wherein the at least one processor is further configured to, upon the determination that at least one of the plurality of vendors comprising the second preferred vendor set has not accepted the order request within the second predetermined time period, accept the manual selection of a vendor.

5. The system of claim 1, wherein the at least one processor is further configured to accept one or more boundary conditions and eliminate any of the vendors comprising the first preferred vendor set for whom the one or more vendor characteristics do not satisfy the one or more boundary conditions.

6. The system of claim 5, wherein the boundary conditions comprise a cost for the requested good or service, a geographic location of the vendor, and a projection of a completion date for the requested good or service by the vendor.

7. The system of claim 1, wherein the one or more vendor characteristics comprise the vendor's distance to a property associated with the good or service, past cycle time performance, past quality performance, incidence of order cancelation, and time elapsed since last order.

8. The system of claim 1, wherein the order characteristics comprise one or more requisite characteristics and one or more ranking characteristics.

9. The system of claim 8, wherein the processor is further configured to, upon the expiration of a predetermined time or the exhaustion of the set of viable vendors, assign the order request to an agent, wherein the agent may determine whether one or more requisite characteristics or one or more boundary conditions should be relaxed, and manually assign the order to a vendor.

10. A computer implement method comprising:
storing, by at least one processor, a database in a storage medium comprising a plurality of vendors, each of the plurality of vendors characterized by one or more vendor characteristics;
associating, by the least one processor, a requested product or service with a plurality of order characteristics;
comparing, by the least one processor, the one or more vendor characteristics for each of the plurality of vendors with the plurality of order characteristics;
filtering, by the least one processor, the plurality of vendors to yield a set of viable vendors according to the comparison;
ranking, by the least one processor, the set of viable vendors according to the extent to which the plurality of order characteristics is matched with the one or more vendor characteristics;
selecting, by the least one processor, a first predetermined number of the plurality of vendors comprising the set of viable vendors according to the ranking to yield a first preferred vendor set;
simultaneously transmitting, by the least one processor, to each of the plurality of vendors in the first preferred vendor set an order request identifying the requested product or service;
determining, by the least one processor, whether at least one of the plurality of vendors comprising the first preferred vendor set accepts the order request within a first predetermined time period;
upon a determination that at least one of the plurality of vendors comprising the first preferred vendor set accepts the order request within a first predetermined time period, facilitating, by the least one processor, completion of the order request with the first in time of the at least one of the plurality of vendors to accept the order request;
upon a determination that at least one of the plurality of vendors comprising the first preferred vendor set does not accept the order request within the first predetermined time period, expanding, by the least one processor, the selection of the first preferred vendor set to yield a second preferred vendor set;
upon the expansion to the second preferred vendor set, determining, by the least one processor, whether at least one of the plurality of vendors comprising the second preferred vendor set accepts the order request within a second predetermined time period;
upon the determination that at least one of the plurality of vendors comprising the second preferred vendor set accepts the order request within a second predetermined time period, facilitating, by the least one processor, completion of the order request with the first in time of the at least one of the plurality of vendors to accept the order request.

11. The method of claim 10 further comprising determining, by the least one processor, if the set of viable vendors has been exhausted and, upon a finding that the set of viable vendors has not been exhausted, repeating the process until a vendor accepts the order request.

12. The method of claim 10 further comprising determining, by the least one processor, if an overall time limit has elapsed and, upon a finding that the overall time limit has not elapsed, repeat the process until a vendor accepts the order request.

13. The method of claim 10 further comprising:
upon the determination that at least one of the plurality of vendors comprising the second preferred vendor set has not accepted the order request within the second predetermined time period, accepting, by the least one processor, the manual selection of a vendor.

14. The method of claim 10 further comprising accepting, by the least one processor, one or more boundary conditions and eliminate any of the vendors comprising the first preferred vendor set for whom the one or more vendor characteristics do not satisfy the one or more boundary conditions.

15. The method of claim 14, wherein the boundary conditions comprise a cost for the requested good or service, a geographic location of the vendor, and a projection of a completion date for the requested good or service by the vendor.

16. The method of claim 10, wherein the one or more vendor characteristics comprise the vendor's distance to a property associated with the good or service, past cycle time performance, past quality performance, incidence of order cancelation, and time elapsed since last order.

17. The method of claim 10, wherein the order characteristics comprise one or more requisite characteristics and one or more ranking characteristics.

18. The method of claim 10 further comprising:
upon the expiration of a predetermined time or the exhaustion of the set of viable vendors, assigning, by the least one processor, the order request to an agent, wherein the agent may determine whether one or more requisite characteristics or one or more boundary conditions should be relaxed, and manually assign the order to a vendor.

* * * * *